(12) United States Patent
Panec et al.

(10) Patent No.: US 10,916,061 B2
(45) Date of Patent: Feb. 9, 2021

(54) SYSTEMS AND METHODS TO SYNCHRONIZE REAL-WORLD MOTION OF PHYSICAL OBJECTS WITH PRESENTATION OF VIRTUAL CONTENT

(71) Applicant: Disney Enterprises, Inc., Burbank, CA (US)

(72) Inventors: Timothy M. Panec, Burbank, CA (US); Janice Rosenthal, Burbank, CA (US); Hunter J. Gibson, Burbank, CA (US); Nathan D. Nocon, Burbank, CA (US); Stephen A. Thornton, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/393,781

(22) Filed: Apr. 24, 2019

(65) Prior Publication Data

US 2020/0342683 A1    Oct. 29, 2020

(51) Int. Cl.
| | | |
|---|---|---|
| *G06T 19/00* | (2011.01) | |
| *G06T 19/20* | (2011.01) | |
| *A63F 13/2145* | (2014.01) | |
| *G06F 3/048* | (2013.01) | |

(52) U.S. Cl.
CPC ........ *G06T 19/006* (2013.01); *A63F 13/2145* (2014.09); *G06F 3/048* (2013.01); *G06T 19/20* (2013.01)

(58) Field of Classification Search
CPC ....... G06T 19/006; G06T 19/20; G06F 3/048; A63F 13/2145
See application file for complete search history.

(56) References Cited

U.S. PATENT DOCUMENTS

| | | | |
|---|---|---|---|
| 6,162,123 A | 12/2000 | Woolston | |
| 7,719,563 B2 | 5/2010 | Richards | |
| 9,972,138 B2 | 5/2018 | Goslin | |
| 10,223,836 B2 | 3/2019 | Goslin | |
| 10,300,372 B2 | 5/2019 | Goslin | |

(Continued)

FOREIGN PATENT DOCUMENTS

CN        109068161 A    * 12/2018

OTHER PUBLICATIONS

Hashimoto, Sunao, et al., "Touch Me: An Augmented Realtiy Based Remote Robot Manipulation", The 21st International Conference on Artificial Reality and Telexistence, Nov. 28-30, 2011, Osaka, Japan, The Virtual Relaity Society of Japan, pp. 61-66 (Year: 2011).*

(Continued)

*Primary Examiner* — William A Beutel
(74) *Attorney, Agent, or Firm* — Esplin & Associates, PC

(57) ABSTRACT

This disclosure presents systems and methods to synchronize real-world motion of physical objects with presentation of virtual content. Individual physical objects may be detected and/or identified based on image information defining one or more images of a real-world environment. Individual network connections may be established between individual computing platforms and individual physical objects. A network connection may facilitate a synchronization of a presentation of virtual content on a computing platform with motion of one or more physical objects in the real-world environment.

18 Claims, 5 Drawing Sheets

(56) References Cited

U.S. PATENT DOCUMENTS

| | | | |
|---|---|---|---|
| 10,304,251 B2 | 5/2019 | Pahud | |
| 10,481,680 B2 | 11/2019 | Panec | |
| 10,546,431 B2 | 1/2020 | Hsu | |
| 10,587,834 B2 | 3/2020 | Goslin | |
| 2002/0024675 A1 | 2/2002 | Foxlin | |
| 2007/0126700 A1 | 6/2007 | Wright | |
| 2007/0252815 A1 | 11/2007 | Kuo | |
| 2010/0261526 A1 | 10/2010 | Anderson | |
| 2011/0250962 A1 | 10/2011 | Feiner | |
| 2012/0050535 A1 | 3/2012 | Densham | |
| 2012/0262365 A1 | 10/2012 | Mallinson | |
| 2012/0327117 A1 | 12/2012 | Weller | |
| 2013/0042296 A1 | 2/2013 | Hastings | |
| 2013/0044128 A1 | 2/2013 | Liu | |
| 2013/0229396 A1 | 9/2013 | Huebner | |
| 2013/0286004 A1 | 10/2013 | McCulloch | |
| 2014/0002329 A1 | 1/2014 | Nishimaki | |
| 2014/0003651 A1 | 1/2014 | Smoot | |
| 2014/0078517 A1 | 3/2014 | Ben-Yishai | |
| 2014/0080109 A1 | 3/2014 | Haseltine | |
| 2014/0104169 A1 | 4/2014 | Masselli | |
| 2014/0116469 A1* | 5/2014 | Kim | G05D 1/0016 134/18 |
| 2014/0160117 A1 | 6/2014 | Nehmadi | |
| 2015/0035677 A1 | 2/2015 | Williams | |
| 2015/0201188 A1 | 7/2015 | Pritch | |
| 2015/0243286 A1 | 8/2015 | Goslin | |
| 2015/0248785 A1 | 9/2015 | Holmquist | |
| 2016/0055677 A1* | 2/2016 | Kuffner | B62D 57/032 345/633 |
| 2016/0189411 A1 | 6/2016 | Matsunaga | |
| 2016/0206957 A1 | 7/2016 | Goslin | |
| 2016/0247324 A1 | 8/2016 | Mullins | |
| 2016/0253842 A1 | 9/2016 | Shapira | |
| 2016/0260261 A1 | 9/2016 | Hsu | |
| 2016/0274662 A1 | 9/2016 | Rimon | |
| 2016/0299563 A1 | 10/2016 | Stafford | |
| 2016/0327798 A1 | 11/2016 | Xiao | |
| 2016/0352930 A1 | 12/2016 | Fujita | |
| 2017/0087465 A1 | 3/2017 | Lyons | |
| 2017/0124713 A1 | 5/2017 | Jurgenson | |
| 2017/0132841 A1 | 5/2017 | Morrison | |
| 2017/0161561 A1 | 6/2017 | Marty | |
| 2017/0203225 A1 | 7/2017 | Goslin | |
| 2017/0213387 A1 | 7/2017 | Bean | |
| 2017/0228936 A1 | 8/2017 | Goslin | |
| 2017/0257594 A1 | 9/2017 | Goslin | |
| 2017/0295229 A1 | 10/2017 | Shams | |
| 2018/0081439 A1 | 3/2018 | Daniels | |
| 2018/0173300 A1 | 6/2018 | Schwarz | |
| 2018/0190017 A1 | 7/2018 | Mendez | |
| 2018/0204362 A1 | 7/2018 | Tinsman | |
| 2018/0239144 A1 | 8/2018 | Woods | |
| 2018/0295324 A1 | 10/2018 | Clark | |
| 2018/0350056 A1 | 12/2018 | Cardenas Bernal | |
| 2018/0350118 A1 | 12/2018 | Bastaldo-Tsampalis | |
| 2018/0365893 A1 | 12/2018 | Mullins | |
| 2019/0019346 A1 | 1/2019 | Cuthbertson | |
| 2019/0243446 A1 | 8/2019 | Panec | |
| 2019/0304191 A1 | 10/2019 | Hsu | |
| 2019/0329405 A1* | 10/2019 | Atohira | B25J 9/1605 |
| 2020/0037144 A1* | 1/2020 | Chen | G06F 3/0488 |
| 2020/0101372 A1 | 4/2020 | Drake | |
| 2020/0306647 A1 | 10/2020 | Goslin | |

OTHER PUBLICATIONS

Dictionary.com, Defintion of lightsaber, 2019, Dictionary.com, pp. 1-2 (Year: 2019).

Virtual and Augmented Reality, Oct. 2016, Citi GPS: Global Perspectives & Solutions. (128 pages).

* cited by examiner

SYSTEMS AND METHODS TO SYNCHRONIZE REAL-WORLD MOTION OF PHYSICAL OBJECTS WITH PRESENTATION OF VIRTUAL CONTENT

FIELD

This disclosure relates to systems and methods to synchronize real-world motion of physical objects with presentation of virtual content.

BACKGROUND

Augmented reality may involve using a display device to alter or 'augment' a user's view of their real-world surroundings by placing virtual content into view. Virtual objects may be overlaid on top of views of real objects and may be controlled to portray interactions with the real objects, but the real objects may not interact with the virtual objects.

SUMMARY

One aspect of the disclosure relates to a system configured to synchronize real-world motion of physical objects with presentation of virtual content. The synchronization may take place within an interactive space. An interactive space may include one or both of an augmented reality (AR) environment, a virtual reality (VR) environment, and/or other interactive spaces. An augmented reality environment may include views of images forming virtual content superimposed over views of the real world. A virtual reality environment may include views of images forming virtual content within a virtual environment. The terms "space" and "environment" in the context of virtual reality and/or augmented reality may be used interchangeably herein. Virtual content may include one or more of virtual objects, virtual worlds, and/or other virtual content.

In some implementations, a computing platform may detect a physical object, such as a toy, using image-based recognition techniques and/or other techniques. Virtual content may be presented on the computing platform and synched with motion of articulatable components of the physical object. The articulatable components of the physical object may, in turn, also move in synch with the presentation of the virtual content. By way of non-limiting illustration, virtual content may include an animation of a fish what "jumps" into a toy's mouth, and the toy's mouth may be controlled to close right as the animated fish is at a perceived position of the mouth in the camera view. Audio outputs by toy may be synched with the animation. As another non-limiting example, a physical object may comprise a doll house where virtual characters/gameplay may require the user to open/close physical doors and/or move around chairs, tables, and/or other accessories to cause the virtual characters to be perceived as interacting with the doll house. As yet another non-limiting example, a user's device may communicate with a doll house (e.g., through Bluetooth) so that the doll house's doors open and/or close automatically in synchronization with an AR animation. For example, a virtual character composited into the scene on the user device may appear to walk towards the door, and the door may open, lights flash, sound emitted, etc. as the virtual character appears to walk through the door and "disappear" into the doll house. The door may then automatically close when the character "disappears" into the doll house.

One or more implementations of a system configured to synchronize real-world motion of physical objects with presentation of virtual content may include one or more of one or more servers, one or more computing platforms, one or more physical objects, and/or other components. The one or more servers may include one or more physical processors. The one or more servers may communicate with one or more computing platforms via client/server architecture, and/or other communication schemes. The one or more physical processors may be configured by machine-readable instructions. Executing the machine-readable instructions may cause the one or more physical processor to facilitate synchronizing real-world motion of physical objects with presentation of virtual content. The machine-readable instructions may include one or more computer program components. The computer program components may include one or more of a detection component, a communication component, and/or other components.

The detection component may be configured to obtain image information and/or other information. The image information may define one or more images of a real-world environment. The detection component may be configured to detect, based on the image information and/or other information, presence in the real-world environment of one or more physical objects. The detection component may be configured to identify, based on the image information and/or other information, individual ones of the one or more physical objects detected as being present in the real-world environment. By way of non-limiting illustration, a first physical object may be identified.

The communication component may be configured to establish individual network connections between a computing platform and individual physical objects. The individual network connections may facilitate a synchronization of a presentation of virtual content on the computing platform with motion of the individual physical objects in the real-world environment. By way of non-limiting illustration, a first network connection may be established between the computing platform and the first physical object. The first network connection may facilitate synchronization of presentation of first virtual content on the computing platform with first motion of the first physical object.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
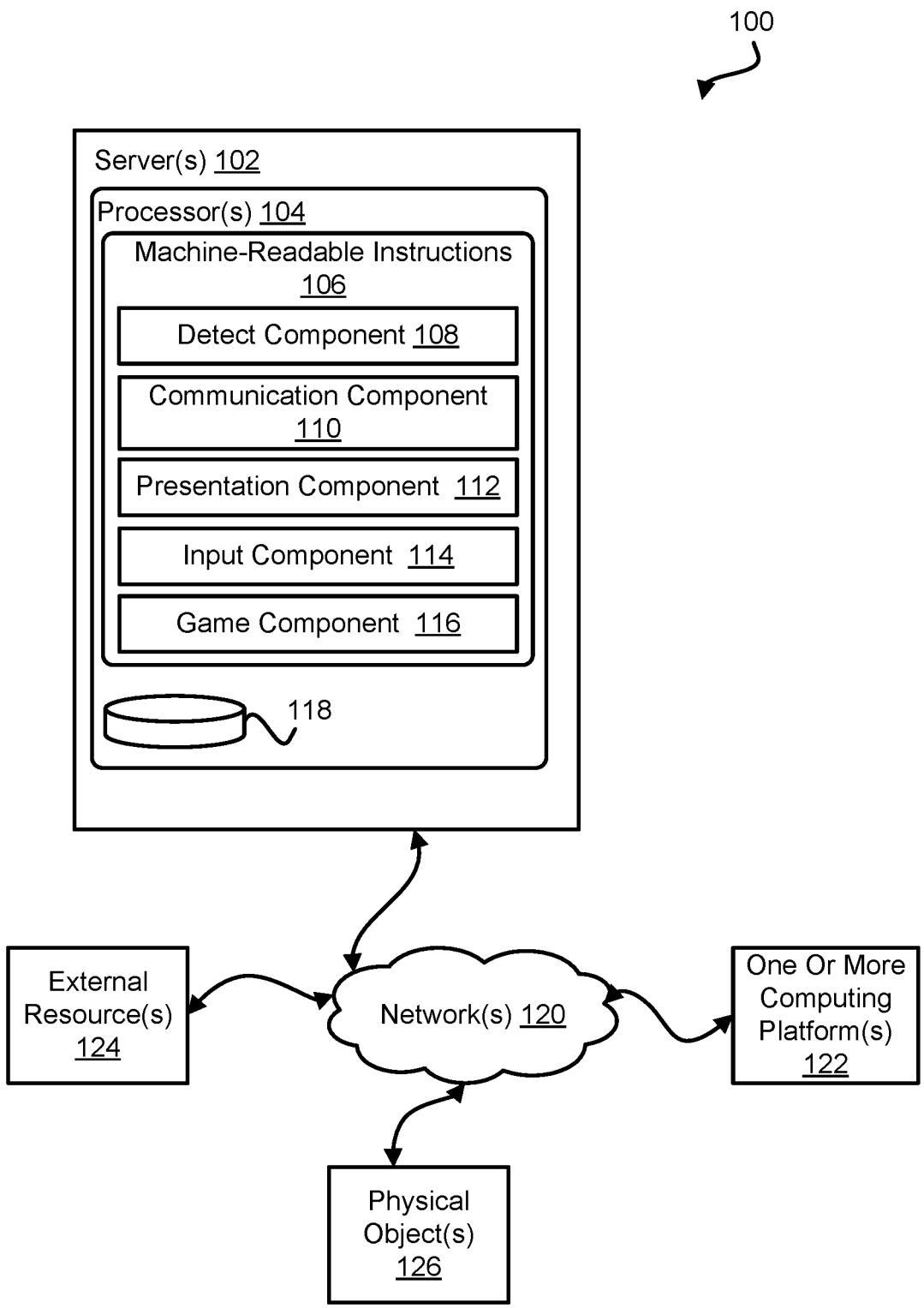
FIG. 1 illustrates a system configured to synchronize real-world motion of physical objects with presentation of virtual content, in accordance with one or more implementations.

FIG. 1 illustrates a system 100 configured to synchronize real-world motion of physical objects with presentation of virtual content, in accordance with one or more implementations. Some previous attempts to synchronize real and virtual interactions may require highly sophisticated presentation devices and/or may require users to travel to locations where complex physical devices are built and constructed to interact with virtual content. One or more implementations of the system 100 presented herein may provide a more seamless experience. For example, one or more implementations may allow for augmented reality play that is easy for children to use and/or can be easily incorporated into a variety of play contexts. The synchronization may take place within an interactive space. An interactive space may include one or both of an augmented reality (AR) environment, a virtual reality (VR) environment, and/or other interactive spaces. An augmented reality environment may include views of images forming virtual content superimposed over views of the real world. A virtual reality environment may include views of images forming virtual content within a virtual environment. The terms "space" and "environment" in the context of virtual reality and/or augmented reality may be used interchangeably herein. Virtual content may include one or more of virtual objects, virtual worlds, and/or other virtual content.

The system 100 may include one or more of one or more servers 102, one or more computing platforms 122, one or more physical objects 126, and/or other components. The one or more servers 102 may include one or more of one or more physical processors 104, non-transitory electronic storage 118, and/or other components. The non-transitory electronic storage 118 may be configured to store information utilized by one or more servers 102, one or more computing platforms 122, and/or other components of system 100.

In some implementations, one or more servers 102 may be configured to provide remote hosting of features and/or functions of machine-readable instructions 106 to individual computing platform of the one or more computing platforms 122. The one or more computing platforms 122 may be remotely located from one or more servers 102. The one or more servers 102 may communicate with one or more computing platforms 122 via client/server architecture, and/or other communication schemes. By way of non-limiting illustration, individual computing platforms of one or more computing platform 122 may download an application (e.g., non-transitory electronically stored information) configured to provide access to features and/or functions of machine-readable instructions 106. In some implementations, one or more features and/or functions of one or more servers 102 may be attributed as local features and/or functions of one or more computing platforms 122. For example, individual computing platforms of one or more computing platforms 122 may obtain and/or include machine-readable instructions that may be the same or similar to machine-readable instructions 106 of one or more physical processors 104. Individual computing platforms of one or more computing platforms 122 may include one or more of a mobile computing platform (e.g., one or more of a cellular telephone, a smartphone, a laptop, a tablet computer, a virtual reality platform, and/or other computing platforms), a stationary computing platform (e.g., a desktop computer), and/or other computing platforms. In some implementations, a virtual reality platform may include a virtual reality headset (e.g., goggles, glasses, and/or other headset), and/or other virtual reality platform.

Individual computing platforms of one or more computing platforms 122 may include one or more of a display, one or more sensors, one or more audio output devices, and/or other components. A display may be configured to present one or more of individual images, image sequences, video, text, and/or other information. Presentation via a display of a computing platform may be facilitated by one or more processors of the computing platform and/or other components. By way of non-limiting example, presentation may be facilitated by a graphics processing unit (GPU) and/or other components. A display may include one or more of screen, a touchscreen, a monitor, a head-mounted display, a set of screens, and/or other displays. An audio output device may be configured to present audio content in the form of words, sounds, and/or other audio content. An audio output device may include, for example, a speaker.

Individual sensors of an individual computing platform may be configured to generate output signals conveying information utilized by components of the system 100. An individual sensor of an individual computing platform may include an image sensor and/or other sensors.

An image sensor may be configured to generate output signals conveying image information and/or other information. In some implementations, image information may define one or more of an image, an image sequence, a video, and/or other representations of the real-world space. An image may be defined by a set of pixels and/or other information. Individual pixels in the set of pixels may be defined by one or more of a pixel location, a pixel color, and/or other specifications. A pixel location may include a location on an image plane. Pixel color may be defined by chromaticity of colors specified within a color space, such as an RGB color space. An image sensor may include one or more of a charge-coupled device sensor, an active pixel sensor, a complementary metal-oxide semiconductor sensor, an N-type metal-oxide-semiconductor sensor, and/or other devices.

Individual physical objects of one or more physical objects 126 may be configured to communicate with individual computing platforms of one or more computing platforms 122, one or more servers 102, and/or other components of system 100 according to a client/server architecture, peer-to-peer architecture, and/or other architectures. Communications may be facilitated through network(s) 120. The network(s) 120 may include wired and/or wireless connections. The network(s) 120 may include the Internet, Bluetooth, USB, and/or other communication networks. It will be appreciated that this is not intended to be limiting and that the scope of this disclosure includes implementations in which components of system 100 may be operatively linked via some other communication media.

Individual physical objects may include one or more of one or more sensors, one or more articulatable components, one or more output devices, one or more wireless communication devices, and/or other components. In some implementations, a physical object may have a form factor of one or more of a toy, a figurine, an article of clothing, and/or other forms.

The one or more articulatable components of a physical object may include and/or may be coupled to devices and/or systems configured to manipulate individual articulatable components. The manipulation may cause the physical object to experience locomotion in the real world. The one or more devices and/or systems configured to facilitate manipulation of individual articulatable components may include one or more of processors, controllers, gears, motors, pulleys, actuators, and/or other devices.

The one or more wireless communication devices may be configured to effectuate communication of information to one or more devices external to a physical object. A wireless communication device may include a device configured engaged in wireless communication. Wireless communication may include one or more of radio communication, Bluetooth communication, Wi-Fi communication, cellular communication, infrared communication, and/or other wireless communication. A wireless communication device may include one or more of an antenna, a Bluetooth device, Wi-Fi device, and/or other devices.

The one or more output devices of a physical object may include devices configured to provide one or more of visual, auditory, and/or tactile output. An output device may include one or more of a display screen, an audio output device, a tactile output device, a light source, and/or other devices. A display screen may be configured to present visual output in the form of one or more of images, video, and/or text. A display screen may include, for example, a liquid-crystal display (LCD) screen and/or other displays screens. A light source may include one or more of a light-emitting diode, laser, a light bulb, and/or other light sources. An audio output device may be configured to present audio content in the form of words, sounds, and/or other audio content. An audio output device may include, for example, a speaker. A tactile output device may be configured to provide tactile output. A tactile output device may include one or more of a heating element, a vibration motor, and/or other tactile output devices.

An individual sensor of a physical object may include one or more of an orientation sensor, a location sensor, a contact sensor, an audio sensor, and/or other sensors.

In some implementations, an orientation sensor of may be configured to generate output signals conveying orientation information and/or other information. Orientation information derived from output signals of an orientation sensor may define an orientation of a physical object and/or an articulatable component of the physical object. In some implementations, orientation may refer to one or more of a pitch angle, a roll angle, a yaw angle, and/or other measurements. An orientation sensor may include an inertial measurement unit (IMU) such as one or more of an accelerometer, a gyroscope, a magnetometer, Inclinometers, Electronic nose, Infrared Imagers, Micro-bolometers, micro-displays (DMD), Digital micro-mirror device, Optical Switches, and/or other devices.

In some implementations, a location sensor may be configured to generate output signals conveying location information and/or other information. Location information derived from output signals of a location sensor may define one or more of a geo-location of a physical object, a location of a physical object relative another object (e.g., a computing platform), an elevation of a physical object and/or component of a physical object, and/or other measurements. A location sensor may include one or more of a GPS, an altimeter, a pressure sensor, and/or other devices.

In some implementations, a contact sensor may be configured to generate output signals conveying contact information and/or other information. Contact information may indicate one or more of presence or absence of contact between a contact sensor and an object or surface, presence or absence of contact between two surfaces, an amount of pressure imparted on a surface, and/or other information. The contact sensor may include one or more of a capacitive touch sensor, pressure sensor, strain gauge, load cell, and/or other sensors.

An audio sensor may generate output signals conveying audio information and/or other information. The audio information may define voice and/or sounds captured by the audio sensor. An audio sensor may include a microphone.

The one or more physical processors 104 may be configured by machine-readable instructions 106. Executing machine-readable instructions 106 may cause one or more physical processors 104 to facilitate synchronization of real-world motion of physical objects with presentation of virtual content. The machine-readable instructions 106 may include one or more computer program components. The one or more computer program components may include one or more of a detection component 108, a communication component 110, a presentation component 112, an input component 114, a game component 116, and/or other components.

The detection component 108 may be configured to obtain image information derived from output signals of an image sensor of a computing platform and/or other information. The image information may define one or more images of a real-world environment. The detection component 108 may be configured to detect presence of one or more physical objects within the real-world environment. The detection of presence may be determined based on one or more of image information derived from output signals of an image sensor of a computing platform, information received from individual physical objects, and/or other information. In some implementations, detection based on image information may be accomplished through one or more image-processing techniques. By way of non-limiting illustration, techniques may include one or more of computer vision, Speeded Up Robust Features (SURF), Scale-invariant Feature Transform (SIFT), Oriented FAST and rotated BRIEF (ORB), Optical Character Recognition (OCR), facial recognition, and/or other techniques.

In some implementations, detection component 108 may be configured to identify individual physical objects detected as being present in the real-world environment. Identification may be determined based on one or more of image information derived from output signals of an image sensor of a computing platform, information received from individual physical objects, and/or other information. Identification of an individual physical object may include identification one or more of an object type, an object model, an object name, an object serial number, one or more articulatable components of the object, and/or other information relating to a given physical object. In some implementations, identification based on image information may be accomplished through one or more image-processing techniques. In some implementations, the identification of one or more articulatable components of an object may allow system 100 to utilize the one or more articulatable components as anchor points for presenting virtual content. Identification of a physical object and/or one or more articulatable components of the object may include determining information such as relative location of individual ones of the one or more articulatable components on the physical object. For example, location of anchor points on the physical object may be relevant to the presentation of virtual content and/or modifying the virtual content so that it may appear as being fixed to those anchor points.

In some implementations, detection and/or identification of a physical object may be determined based on information received from individual physical objects. Obtaining information from a physical object may include communication component 110 effectuating communication with the physical object to facilitate receiving information from the physical object. Communication may include wireless communication. By way of non-limiting example, wireless communication may include one or more of radio communication, Bluetooth communication, Wi-Fi communication, cellular communication, infrared communication, and/or other wireless communication. For example, a physical object may broadcast wireless signals and wait for replies from computing platforms to initiate detection and/or identification. By way of non-limiting illustration, a computing device may be coupled to an animatronic physical object and may send and/or receive wireless messages to/from nearby user devices to synchronize motion with virtual animations on the user devices. In the context of a theme park, user's may be waiting in line for a ride, and in the queue there might be physical object that appears to be preoccupied with something. The users may be prompted to open an application on their computing platform to detect and/or communicate with the physical object. On the user's screen a virtual character and/or object may be composited into a camera view and the user may see the virtual character and/or object interacting with the physical object, and according to the appropriate timing, location, orientation, and/or other information.

The communication component 110 may be configured to establish individual network connections between individual computing platforms and individual physical objects. The network connections may be via network(s) 120. The network connections may facilitate wireless communication.

The individual network connections may facilitate synchronization of presentation of virtual content on an individual computing platform with motion of an individual physical object in the real-world environment. By way of non-limiting illustration, a first network connection may be established between a first computing platform and a first physical object. The first network connection may facilitate the synchronization of a presentation of first virtual content on the first computing platform with first motion of the first physical object.

The communication component 110 may be configured to effectuate communication of motion control signals from individual computing platforms to individual physical objects. The motion control signals may cause individual physical objects to perform the motion in sync with the presentation of the virtual content at individual computing platforms (see, e.g., presentation component 112). A motion control signal may include one or more of command information, timing information, and/or other information. The command information may include commands directing control of individual devices and/or systems of a physical object to manipulate individual articulatable components of the physical object. The timing information may include information specifying a timing, frequency, and/or amount of manipulation of individual articulatable components of a physical object to cause synchronization. Synchronization may refer to the motion of the individual physical objects occurring at the same time as the presentation of virtual content and/or in response to the presentation of virtual content. In some implementations, motion of the individual physical objects occurring at the same time may include the motion occurring within a threshold time of the presentation of the virtual content that may still result in the user perceiving the motion as if it were occurring at the same time as the presentation of the virtual content. By way of non-limiting illustration, the threshold time may be a tenth of a second, a one hundredth of a second, and/or other threshold time.

In some implementations, the motion control signals may be generated from input information conveying user input via individual computing platforms (see, e.g., input component 114). In this sense, the user input via a computing platform may initiate a synchronization of presentation of content on the computing platform with motion of a physical object. By way of non-limiting illustration, first motion control signals may be communicated from the first computing platform to the first physical object to cause the first physical object to perform the first motion in sync with the presentation of the first virtual content.

The communication component 110 may be configured to obtain presentation control signals from individual physical object. In some implementations, individual physical objects may be configured to effectuate communication of presentation control signals from the individual physical objects to the individual computing platforms. The presentation control signals may cause the individual computing platforms to present the virtual content in sync with motion of the individual physical objects. In some implementations, a presentation control signal may include one or more of command information, timing information, and/or other information. The command information may include commands directing control of an individual computing platform to effectuate presentation of virtual content (e.g., graphic processing unit, display, and/or other components of a computing platform). The timing information may include information specifying a timing, frequency, and/or amount of virtual content to present to cause synchronization. Synchronization may refer to the presentation of visual content occurring at the same time as the motion of the individual physical objects and/or in response to the motion of the individual physical objects. In some implementations, the presentation of the virtual content occurring at the same time as the motion of the individual physical objects may include the presentation of the virtual content occurring within a threshold time following the motion of the physical object that may still result in the user perceiving the presentation as if it were occurring at the same time. By way of non-limiting illustration, the threshold time may be a tenth of a second, a one hundredth of a second, and/or other threshold time.

In some implementations, presentation control signals may be generated from input information conveying user input via individual physical objects (see, e.g., input component 114). In this sense, the user input via a physical object may initiate a synchronization of presentation of content on the computing platform with the user-created motion of the physical object. By way of non-limiting illustration, first presentation control signals may be communicated from the first physical object to the first computing platform to cause the first computing platform to present the first virtual content in sync with the first motion of the first physical object. The first motion may correspond to user input via the first physical object (e.g., the user physically manipulating the physical object).

The presentation component 112 may be configured to effectuate presentation of visual content on individual displays of individual computing platforms. The visual content may include real-world content and/or virtual content. The visual content may be generated based on one or more of image information defining images depicting a real-world environment (conveyed by output signals of an image sensor of a computing platform), virtual content information, presentation control signals obtained by communication component 110, and/or other information. The virtual content information may define virtual content. The virtual content may include one or more of a virtual space, virtual objects, and/or other virtual content. The visual content may include views of virtual content superimposed over views of the real-world defined by the image information. Views of virtual content superimposed over views of the real-world may define an augmented reality space.

A presentation component 112 may be configured to execute and/or implement an instance of a virtual space. The instance of the virtual space may be executed to determine state of the virtual space. The state determined and presented may correspond to a location in the virtual space (e.g., location in the game). The view described by the state may correspond, for example, to the location from which the view is taken, the location the view depicts, and/or other locations; a zoom ratio; a dimensionality of objects; a point-of-view; and/or view attributes of the view. One or more of the view attributes may be selectable by a user.

An instance of the virtual space may comprise a simulated space that is accessible by one or more users via the one or more computing platforms 122 that presents the views of the virtual space. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space and/or surface features of a surface or objects that are "native" to the space. In some instances, the topography may describe a surface (e.g., a ground surface) that runs through at least a substantial portion of the space (e.g., comprising at least part of a virtual terrain). In some instances, the topography may describe a volume with one or more bodies positioned therein (e.g., a simulation of gravity-deprived space with one or more celestial bodies positioned therein). An instance executed by the computer components may be synchronous, asynchronous, and/or semi-synchronous.

The above description of the manner in which state of the virtual space is determined by a computer program component is not intended to be limiting. The computer program component may be configured to express the virtual space in a more limited, or richer, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by presentation component 112, one or more users may control game entities, groups of game entities, simulated physical phenomena (e.g., wind, rain, earthquakes, and/or other phenomena), and/or other elements within the virtual space to interact with the virtual space and/or other users. The game entities may include virtual characters, such as avatars, group entities, and/or other considerations. A given game entity may be controlled by a user with which it is associated. The user-controlled element(s) may move through and interact with the virtual space (e.g., non-user characters in the virtual space, other objects in the virtual space). The user-controlled elements controlled by and/or associated with one or more users may be created and/or customized by the one or more users, based on information received by a given client computing platform, and/or may be based on other information. One or more users may have an "inventory" of virtual items, game entities, and/or currency that the one or more users can use (e.g., by manipulation of a virtual character or other user-controlled element, and/or other items) within the virtual space.

A user may participate in the instance of the virtual space by controlling one or more of the available user-controlled game entities in the virtual space. Control may be exercised through control inputs such as entry, selection, and/or commands input by the one or more users. Other users of the virtual space may interact with the one or more users through communications exchanged within the virtual space. Such communications may include one or more of textual chat, instant messages, private messages, voice communications, and/or other communications. Communications may be received and entered by the users via their respective computing platforms. Communications may be routed to and from the appropriate users through network(s) 120 and/or through communications which are external to the system 100 (e.g., text messaging services associated with the users).

The instance of the virtual space and/or an online game that takes place therein may be persistent. That is, the virtual space and/or the game may continue on whether or not individual players are currently logged in and/or participating in the game. A user that logs out of the virtual space and then logs back in some time later may find the virtual space has been changed through the interactions of other players with the virtual space during the time the player was logged out. These changes may include changes to the simulated physical space, changes in the user's inventory, changes in other user's inventories, changes experienced by non-player characters, changes to the virtual items available for use in the game, and/or other changes In some implementations, individual virtual objects may be configured to experience locomotion. The virtual objects may have one or more visual depictions. By way of non-limiting illustration, a virtual object may depict one or more of a real-world entity (e.g., humans and/or animals), a fantastical entity (e.g., one or more of monsters, aliens, animated movie/TV characters, and/or other entities), a real-world object (e.g., furniture, food), a shape (e.g., a star-shape), and/or other entities and/or objects.

The input component 114 may be configured to obtain input information conveying user input. The user input from a user may include one or more of entry and/or selection by the user via a computing platform, input via individual physical objects of one or more physical objects 126, and/or other input.

The user input via a computing platform may include entry and/or selection of individual virtual objects presented on the computing platform. In some implementations, entry and/or selection may be facilitated through a display of a computing platform, such as a touchscreen display. By way of non-limiting illustration, the user may provide input for selecting virtual objects including one or more of tapping, swiping, holding, and/or other input on the touchscreen display.

The input component 114 may be configured to generate motion control signals from the input information conveying user input via a computing platform and/or other information. By way of non-limiting illustration, the first motion control signals may be generated based on the input information conveying first user input via the first computing platform.

In some implementations, user input via individual physical objects may be determined from motion of the individual physical objects. Motion of the individual physical objects may be determined from output signals of one or more sensors included in the individual physical objects. By way of non-limiting illustration, motion may refer to one or more of change in orientation of a physical object derived from output signals of an orientation sensor, change in location of a physical object derived from output signals of a location sensor, change in presence or absence of contact with a physical object derived from output signals of a contact sensor, and/or other motion that may be derived from output signals of one or more sensors.

The input component 114 may be configured to generate presentation control signals from input information conveying user input via the individual ones of the one or more physical objects 126 and/or other information. By way of non-limiting illustration, the first presentation control signals may be generated based on the input information conveying first user input via the first physical object. The first user input may correspond to the first motion of the first physical object.

The game component 116 may be configured to facilitate gameplay via presentation of virtual content and/or motion of physical objects. In some implementations, game component 116 may be configured to effectuate presentation of a game user interface on individual computing platforms. In some implementations, a game user interface may include one or more user interface elements. A user interface element may include one or more of a game score indicator, a task description, avatar customization element, voice recognition through avatar activation, social feed/share button, avatar/multi-player Scoreboard, a comment Section and/or other elements. A task description may provide information related to current gameplay, including, for example, a current task to be completed, a subsequent task to be completed, and/or other information. The game score indicator may display a game score and/or other information.

In some implementations, game component 116 may be configured to modify individual virtual objects based on user input, a particular game, and/or other information. In some implementations, modification may include one or more of causing one or more virtual objects to disappear, causing one or more virtual objects to experience locomotion, and/or other modifications.

It is noted that the above description of gameplay and/or modifications to virtual objects are provided for illustrative purposes only and are not to be considered limiting. Instead, those skilled in the art may appreciate that different types of gameplay and/or virtual object modifications may be provided within the scope of the present disclosure.

Figure 3:
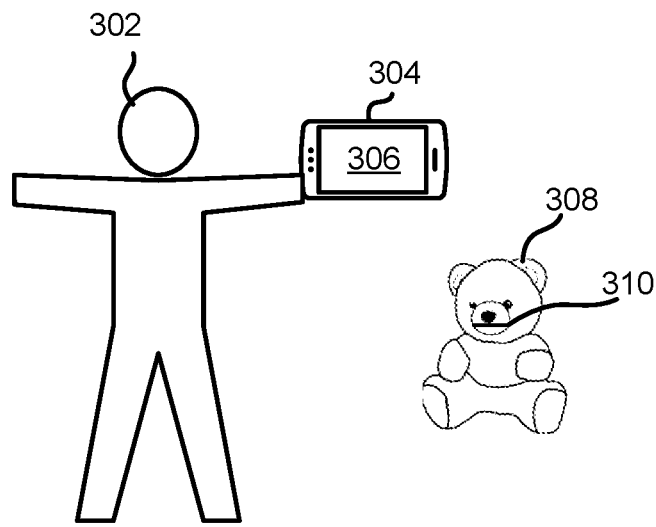
FIG. 3 illustrates an implementation of a system configured to synchronize real-world motion of physical objects with presentation of virtual content.

FIG. 3 illustrates an implementation of a system configured to synchronize real-world motion of physical objects with presentation of virtual content. FIG. 3 shows a user 302, a computing platform 304, and a physical object 308. The physical object 308 may take the form of a toy. The physical object 308 may include one or more articulatable components, such as a mouth 310, one or more sensors, and/or other components. The mouth 310 may provide an anchor point for presenting virtual content. The physical object 308 may include one or more devices configured to manipulate the mouth 310, for example, between open and closed positions. The computing platform 304 may include a handheld mobile computing platform. The computing platform 304 may include a display screen 306. The display screen 306 may comprise a touch screen.

Figure 4:
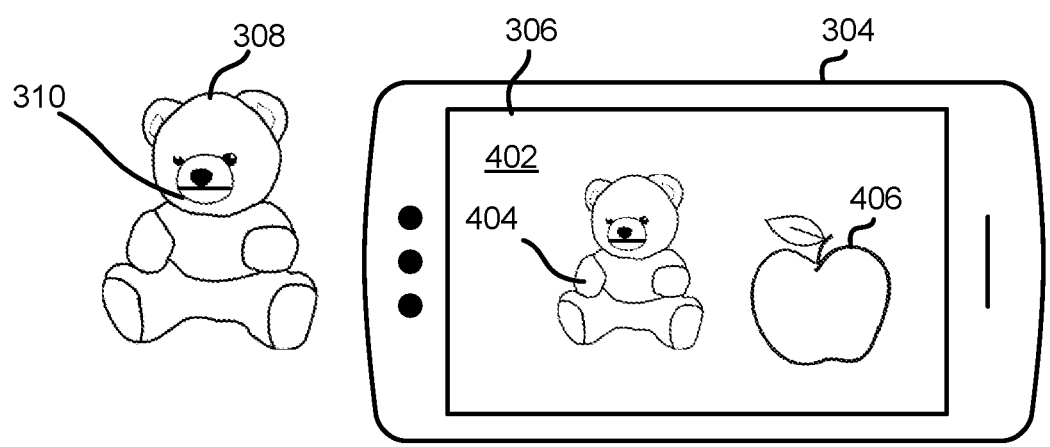
FIG. 4 illustrates an implementation of a system configured to synchronize real-world motion of physical objects with presentation of virtual content.

FIG. 4 further illustrates the implementation of the system in FIG. 3. The computing platform 304 may be configured to obtain image information derived from an image sensor (not shown), detect, and/or identify physical object 308. The computing platform 304 may be configured to effectuate presentation of visual content 402. The visual content 402 may include one or more of a depiction 404 of the physical object 308, a virtual object 406, and/or other content. The computing platform 304 may be configured to establish a network connection between the computing platform 304 and the physical object 308 to facilitate synchronization of the presentation of the visual content 402 with motion of the physical object 308.

Figure 5:
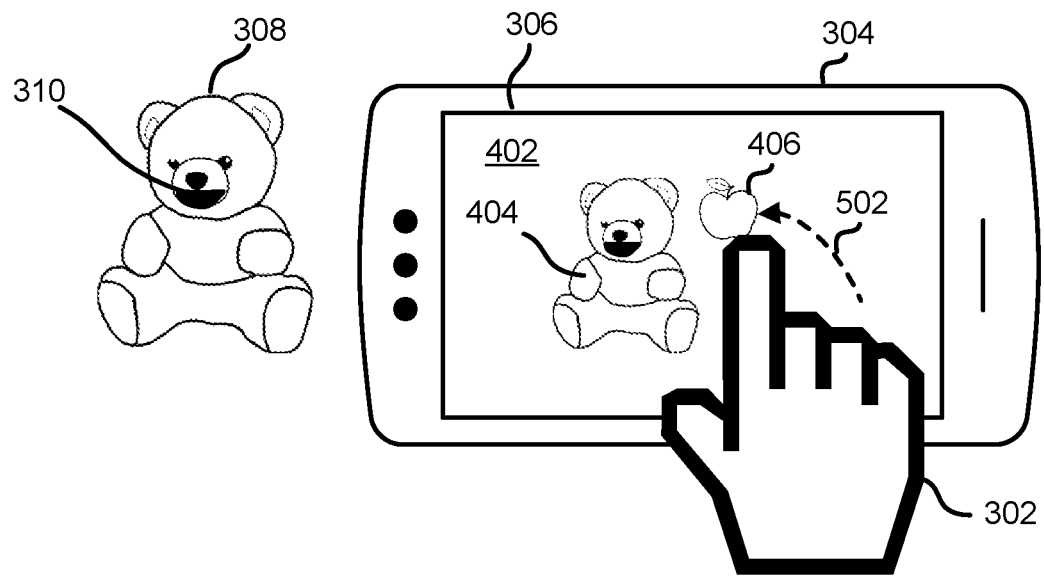
FIG. 5 illustrates an implementation of a system configured to synchronize real-world motion of physical objects with presentation of virtual content.

FIG. 5 further illustrates the implementation of the system in FIGS. 3 and 4. The computing platform 304 may be configured to obtain input information conveying user input 502 via the computing platform 304 (e.g., touch input on display 306). The computing platform 304 may be configured to generate motion control signals from the input information and communicate the motion control signals to the physical object 308. The motion control signals may cause the physical object 308 to perform the motion in sync with the presentation of the visual content 402. By way of non-limiting illustration, the presentation of the visual content 402 may include the movement of virtual object 406 in response to the user input. The motion of the physical object 308 may include manipulating the mouth 310 in the real-world so that the user perceives (e.g., within the view of the visual content 402) the depiction 404 of the physical object 308 as "eating" the virtual object 406.

Figure 6:
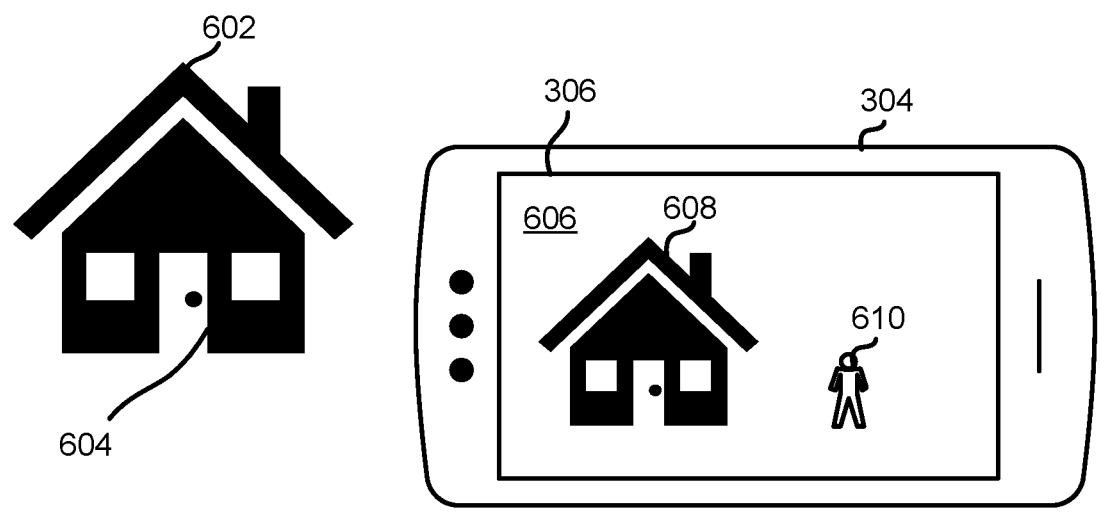
FIG. 6 illustrates an implementation of a system configured to synchronize real-world motion of physical objects with presentation of virtual content.

FIG. 6 illustrates another implementation of a system configured to synchronize real-world motion of physical objects with presentation of virtual content. The computing platform 304 may be configured to obtain image information derived from an image sensor (not shown), detect, and/or identify a physical object 602. The physical object 602 may take the form of a toy, such as a doll house. The physical object 602 may include one or more articulatable components, such as a door 604, one or more sensors, and/or other components. The door 604 may provide an anchor point for presenting virtual content. The computing platform 304 may be configured to effectuate presentation of visual content 606. The visual content 606 may include one or more of a depiction 608 of the physical object 602, a virtual object 610, and/or other content. The computing platform 304 may be configured to establish a network connection between the computing platform 304 and the physical object 602 to facilitate synchronization of the presentation of the visual content 606 with motion of the physical object 602.

Figure 7:
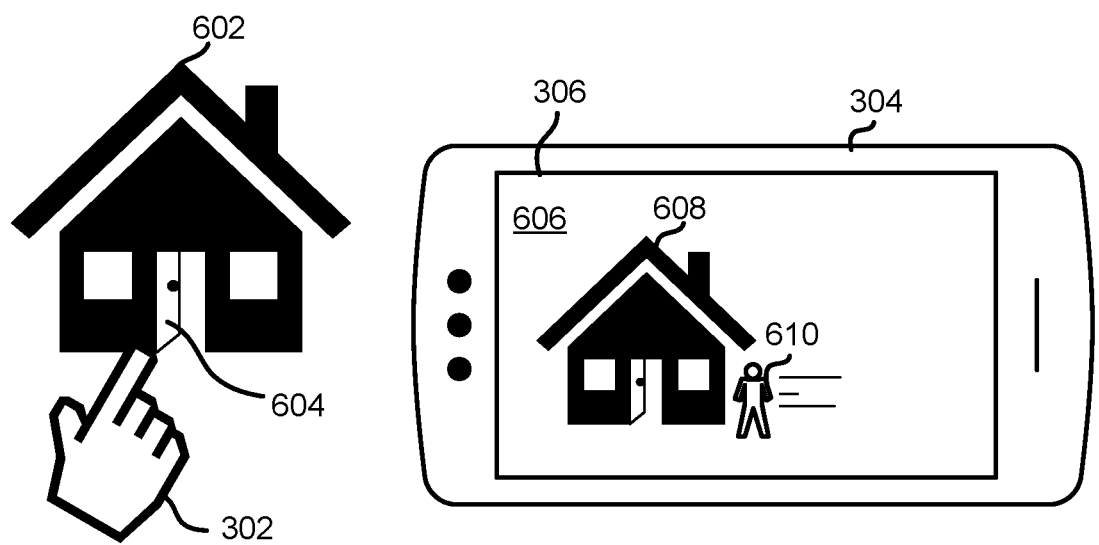
FIG. 7 illustrates an implementation of a system configured to synchronize real-world motion of physical objects with presentation of virtual content.

FIG. 7 further illustrates the implementation of the system in FIG. 6. The computing platform 304 may be configured to obtain input information conveying user input via physical object 602. The user input may correspond to motion of the physical object 602. By way of non-limiting illustration, the motion may include the door 604 opening. The computing platform 304 may be configured to generate and/or obtain presentation control signals from the input information. The presentation control signals may cause the computing platform 304 to present the visual content 606 in sync with the motion of the physical object 602. By way of non-limiting illustration, the presentation of the visual content 606 may include synchronized movement of virtual object 610. The synchronized movement of the virtual object 610 may include moving the virtual object 610 so that the user perceives (e.g., within the view of the visual content 606) the virtual object as "entering" the depiction 608 through the door 604.

Figure 8:
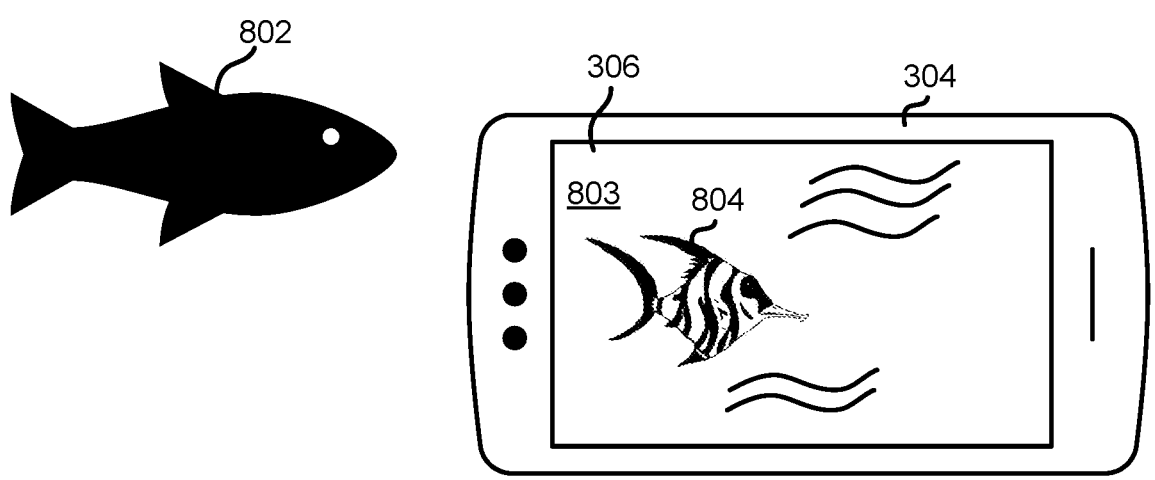
FIG. 8 illustrates an implementation of a system configured to synchronize real-world motion of physical objects with presentation of virtual content.

FIG. 8 illustrates another implementation of a system configured to synchronize real-world motion of physical objects with presentation of virtual content. The computing platform 304 may be configured to obtain image information derived from an image sensor (not shown), detect, and/or identify a physical object 802. The physical object 602 may take the form of a toy. The physical object 802 may include one or more sensors configured to generate output signals conveying motion of the physical object 802 in the real world. The computing platform 304 may be configured to effectuate presentation of visual content 803. The visual content 606 may include a simulated virtual space including one or more virtual objects, including virtual object 804. The computing platform 304 may be configured to establish a network connection between the computing platform 304 and the physical object 802 to facilitate synchronization of the presentation of the visual content 803 with motion of the physical object 802. The computing platform 304 may be configured to obtain input information conveying user input via physical object 802. The user input may correspond to motion of the physical object 802. By way of non-limiting illustration, the motion may include changing a pointing direction of the physical object 802. The computing platform 304 may be configured to generate and/or obtain presentation control signals from the input information. The presentation control signals may cause the computing platform 304 to present the visual content 803 in sync with the motion of the physical object 802. By way of non-limiting illustration, the presentation of the visual content 803 may include synchronized movement of virtual object 804. The synchronized movement of the virtual object 804 may include moving the virtual object 804 to match the movement (e.g., pointing direction) of the physical object 802. In this manner, the physical object 802 may act as a controller for the virtual object 804 within the simulated virtual space.

Returning to FIG. 1, server(s) 102, one or more computing platforms 122, one or more physical objects 126, external resource(s) 124, and/or other components may be operatively linked via one or more electronic communication links. For example, such electronic communication links may be established, at least in part, via one or more networks 120. One or more networks 120 may include the Internet and/or other networks. It will be appreciated that this is not intended to be limiting and that the scope of this disclosure includes implementations in which components of system 100 may be operatively linked via some other communication media.

External resource(s) 124 may include sources of information, hosts, and/or providers of information outside of system 100, external entities participating with system 100, and/or other resources. In some implementations, some or all of the functionality attributed herein to external resource(s) 124 may be provided by resources included in system 100.

Server(s) 102 may include communication lines or ports to enable the exchange of information with a network and/or computing platform(s) 122. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 118 may include electronic storage media that electronically stores information. The electronic storage media of electronic storage 118 may include one or both of system storage that is provided integrally (i.e., substantially non-removable) with server(s) 102 and/or removable storage that is removably connectable to server(s) 102 via, for example, a port or a drive. A port may include a USB port, a firewire port, and/or other port. A drive may include a disk drive and/or other drive. Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 118 may include one or more virtual storage resources (e.g., cloud storage, a virtual private network, and/or other virtual storage resources). Electronic storage 118 may store software algorithms, information determined by processor(s) 104, information received from computing platform(s) 122, and/or other information that enables system 100 to function as described herein.

Processor(s) 104 may be configured to provide information-processing capabilities in server(s) 102. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor(s) 104 may be configured to execute components 108-116. Processor(s) 104 may be configured to execute components 108-116 by software; hardware; firmware; some combination of software, hardware, and/or firmware; and/or other mechanisms for configuring processing capabilities on processor(s) 104.

It should be appreciated that although components 108-116 are illustrated in FIG. 1 as being co-located within a single processing unit, in implementations in which processor(s) 104 includes multiple processing units, one or more of components 108-116 may be located remotely from the other components. While computer program components are described herein as being implemented via processor(s) 104 through machine readable instructions 106, this is merely for ease of reference and is not meant to be limiting. In some implementations, one or more functions of computer program components described herein may be implemented via hardware (e.g., dedicated chip, field-programmable gate array). One or more functions of computer program components described herein may be one or more of software-implemented, hardware-implemented, and/or software and hardware-implemented. The description of the functionality provided by the different components 108-116 described above is for illustrative purposes and is not intended to be limiting, as any of components 108-116 may provide more or less functionality than is described. For example, one or more of components 108-116 may be eliminated, and some or all of its functionality may be provided by other ones of components 108-116 and/or other components. As another example, processor(s) 104 may be configured to execute one or more additional components that may perform some or all of the functionality attributed to one of components 108-116.

Figure 2:
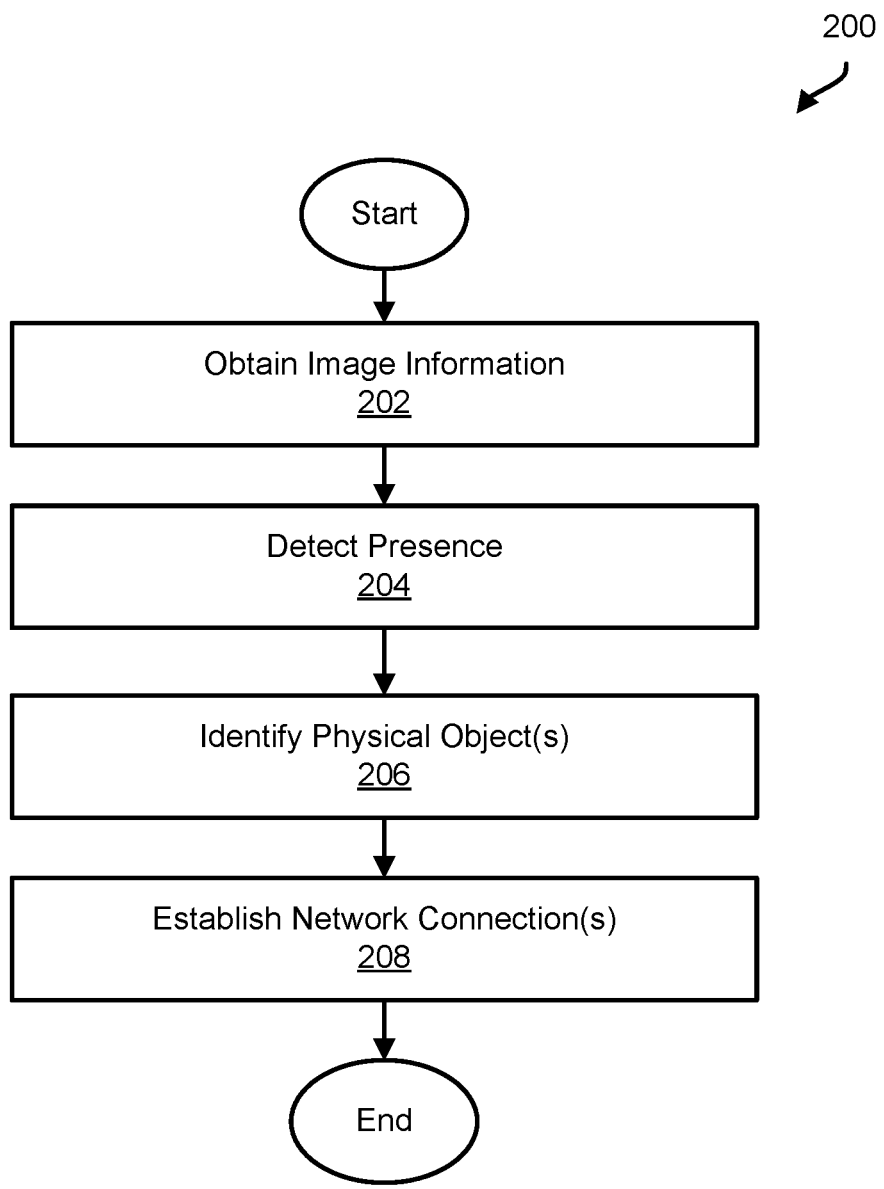
FIG. 2 illustrates a method to synchronize real-world motion of physical objects with presentation of virtual content, in accordance with one or more implementations.

FIG. 2 illustrates a method 200 to synchronize real-world motion of physical objects with presentation of virtual content. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in a system comprising one or more processing devices (e.g., a digital processor, an analog processor, a digital circuit designed to process information, an analog circuit designed to process information, a state machine, and/or other mechanisms for electronically processing information), storage media storing machine-readable instructions, one or more physical objects, and/or other components. The one or more processing devices may include one or more devices executing some or all of the operations of method 200 in response to instructions stored electronically on electronic storage media. The one or more processing devices may include one or more devices configured through hardware, firmware, and/or software to be specifically designed for execution of one or more of the operations of method 200.

At an operation 202, image information may be obtained. The image information may define one or more images of a real-world environment. In some implementations, operation 202 may be performed by one or more physical processors executing a detection component the same as or similar to detection component 108 (shown in FIG. 1 and described herein).

At an operation 204, presence in the real-world environment of one or more physical objects may be detected based on the image information and/or other information. In some implementations, operation 204 may be performed by one or more physical processors executing a detection component the same as or similar to detection component 108 (shown in FIG. 1 and described herein).

At an operation 206, individual ones of the one or more physical objects detected as being present in the real-world environment may be identified. By way of non-limiting illustration, a first physical object may be identified. In some implementations, operation 206 may be performed by one or more physical processors executing a detection component the same as or similar to detection component 108 (shown in FIG. 1 and described herein).

At an operation 208, individual network connections may be established between a computing platform and the individual ones of the one or more physical objects. The individual network connections may facilitate a synchronization of a presentation of virtual content on the computing platform with motion of the individual ones of the one or more physical objects in the real-world environment. By way of non-limiting illustration, a first network connection may be established between the computing platform and the first physical object. The first network connection may facilitate the synchronization of the presentation of first virtual content on the computing platform with first motion of the first physical object. In some implementations, operation 208 may be performed by one or more physical processors executing a communication component the same as or similar to communication component 110 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to synchronize real-world motion of physical objects with presentation of virtual content, the system comprising:
   one or more physical processors configured by machine-readable instructions to:
      obtain image information, the image information defining one or more images of a real-world environment;
      detect, based on the image information, presence in the real-world environment of one or more physical objects;
      identify, based on the image information, individual ones of the one or more physical objects detected as being present in the real-world environment, such that a first physical object is identified;
      establish individual network connections between a computing platform and the individual ones of the one or more physical objects, the individual network connections facilitating a real-time synchronization of virtual motion of virtual content presented on the computing platform with real-world motion of the individual ones of the one or more physical objects in the real-world environment, such that a first network connection is established between the computing platform and the first physical object, the first network connection facilitating the real-time synchronization of first virtual motion of first virtual content presented on the computing platform with first real-world motion of the first physical object; and
      responsive to the real-world motion of the individual ones of the one or more physical objects in the real-world environment, effectuate communication of presentation control signals from the individual ones of the one or more physical objects to the computing platform, the presentation control signals causing the computing platform to present the virtual content to exhibit the virtual motion in sync with the real-world motion of the individual ones of the one or more physical objects, such that responsive to the first real-world motion of the first physical object, first presentation control signals are communicated from the first physical object to the computing platform to cause the computing platform to present the first virtual content to exhibit the first virtual motion in sync with the first real-world motion of the first physical object.

2. The system of claim 1, wherein the one or more physical processors are further configured by the machine-readable instructions to:
obtain input information conveying user input via the individual ones of the one or more physical objects, the user input via the individual ones of the one or more physical objects corresponding to the real-world motion of the individual ones of the one or more physical objects; and
generate the presentation control signals from the input information, such that the first presentation control signals are generated based on the input information conveying first user input via the first physical object, the first user input corresponding to the first real-world motion of the first physical object.

3. The system of claim 1, wherein the one or more physical processors are further configured by the machine-readable instructions to:
responsive to the virtual motion of the virtual content presented on the computing platform, effectuate communication of motion control signals from the computing platform to the individual ones of the one or more physical objects, the motion control signals causing the individual ones of the one or more physical objects to perform the real-world motion in sync with the virtual motion of the virtual content at the computing platform, such that responsive to second virtual motion of the first virtual content, first motion control signals are communicated from the computing platform to the first physical object to cause the first physical object to perform second real-world motion in sync with the second virtual motion of the first virtual content.

4. The system of claim 3, wherein the one or more physical processors are further configured by the machine-readable instructions to:
obtain input information conveying user input via the computing platform; and
generate the motion control signals from the input information, such that the first motion control signals are generated based on the input information conveying first user input via the computing platform.

5. The system of claim 1, wherein the individual network connections are wireless connections.

6. The system of claim 1, wherein the first physical object includes one or more articulatable components and one or more devices configured to manipulate individual ones of the one or more articulatable components to cause the first real-world motion of the first physical object, and wherein the one or more physical processors are further configured by the machine-readable instructions to:
determine individual locations of individual ones of the one or more articulatable components such that the individual locations provide individual anchor points for presenting the first virtual content.

7. The system of claim 1, wherein the first virtual content includes one or more virtual objects superimposed over views of the real-world environment.

8. The system of claim 1, wherein the first virtual content includes a simulated space comprising one or more virtual objects.

9. The system of claim 1, wherein the computing platform is a handheld mobile computing platform.

10. A method to synchronize real-world motion of physical objects with presentation of virtual content, the method comprising:
obtaining image information, the image information defining one or more images of a real-world environment;
detecting, based on the image information, presence in the real-world environment of one or more physical objects;
identifying, based on the image information, individual ones of the one or more physical objects detected as being present in the real-world environment, including identifying a first physical object;
establishing individual network connections between a computing platform and the individual ones of the one or more physical objects, the individual network connections facilitating a real-time synchronization of virtual motion of virtual content presented on the computing platform with real-world motion of the individual ones of the one or more physical objects in the real-world environment, including establishing a first network connection between the computing platform and the first physical object, the first network connection facilitating the real-time synchronization of first virtual motion of first virtual content presented on the computing platform with first real-world motion of the first physical object; and
responsive to the real-world motion of the individual ones of the one or more physical objects in the real-world environment, effectuating communication of presentation control signals from the individual ones of the one or more physical objects to the computing platform, the presentation control signals causing the computing platform to present the virtual content to exhibit the virtual motion in sync with the real-world motion of the individual ones of the one or more physical objects, including responsive to the first real-world motion of the first physical object, effectuating communication of first presentation control signals from the first physical object to the computing platform to cause the computing platform to present the first virtual content to exhibit the first virtual motion in sync with the first real-world motion of the first physical object.

11. The method of claim 10, further comprising:
obtaining input information conveying user input via the individual ones of the one or more physical objects, the user input via the individual ones of the one or more physical objects corresponding to the real-world motion of the individual ones of the one or more physical objects; and
generating the presentation control signals from the input information, including generating the first presentation control signals based on the input information conveying first user input via the first physical object, the first user input corresponding to the first real-world motion of the first physical object.

12. The method of claim 10, further comprising:
responsive to the virtual motion of the virtual content presented on the computing platform, effectuating communication of motion control signals from the computing platform to the individual ones of the one or more physical objects, the motion control signals causing the individual ones of the one or more physical objects to perform the real-world motion in sync with the virtual motion of the virtual content at the computing platform, including responsive to second virtual motion of the first virtual content, communicating first motion control signals from the computing platform to the first physical object to cause the first physical object to perform second real-world motion in sync with the second virtual motion of the first virtual content.

13. The method of claim 12, further comprising:
obtaining input information conveying user input via the computing platform; and
generating the motion control signals from the input information, including generating the first motion control signals based on the input information conveying first user input via the computing platform.

14. The method of claim 10, wherein the individual network connections are wireless connections.

15. The method of claim 10, wherein the first physical object includes one or more articulatable components and one or more devices configured to manipulate individual ones of the one or more articulatable components to cause the first real-world motion of the first physical object, and wherein the method further comprises:
determining individual locations of individual ones of the one or more articulatable components such that the individual locations provide individual anchor points for presenting the first virtual content.

16. The method of claim 10, wherein the first virtual content includes one or more virtual objects superimposed over views of the real-world environment.

17. The method of claim 10, wherein the first virtual content includes a simulated space comprising one or more virtual objects.

18. The method of claim 10, wherein the computing platform is a handheld mobile computing platform.

* * * * *